United States Patent [19]
Ihalainen

[11] Patent Number: 5,944,198
[45] Date of Patent: Aug. 31, 1999

[54] BICYCLE STAND

[76] Inventor: Kalevi Ihalainen, Ojantie 17, FIN-28130, Pori, Finland

[21] Appl. No.: 08/981,560
[22] PCT Filed: Jul. 3, 1996
[86] PCT No.: PCT/FI96/00390
  § 371 Date: Jan. 6, 1998
  § 102(e) Date: Jan. 6, 1998
[87] PCT Pub. No.: WO97/02976
  PCT Pub. Date: Jan. 30, 1997
[51] Int. Cl.$^6$ ..................................... E05B 71/00
[52] U.S. Cl. .................................. 211/5; 211/20
[58] Field of Search .................... 211/5, 20, 21, 211/22; 248/551, 552, 553; 70/62, 234, 235

[56] References Cited

U.S. PATENT DOCUMENTS

| | | | |
|---|---|---|---|
| 565,057 | 8/1896 | Westphal | 211/20 X |
| 595,891 | 12/1897 | Robertson | 211/22 X |
| 611,401 | 9/1898 | White | 70/234 |
| 686,044 | 11/1901 | Flint | 211/22 |
| 3,116,836 | 1/1964 | McCauley | 211/21 |
| 3,861,533 | 1/1975 | Radek . | |
| 3,863,767 | 2/1975 | Garwood | 70/234 X |
| 3,918,599 | 11/1975 | Porter | 248/552 X |
| 3,944,079 | 3/1976 | Boslough | 211/22 X |
| 3,964,610 | 6/1976 | Deiner | 211/22 X |
| 4,050,583 | 9/1977 | Szabo | 211/20 |
| 4,269,049 | 5/1981 | Henderson | 211/20 X |
| 5,278,538 | 1/1994 | Ainsworth et al. | 70/235 X |
| 5,301,817 | 4/1994 | Merritt | 211/20 |

FOREIGN PATENT DOCUMENTS

| | | |
|---|---|---|
| 66822 | 5/1948 | Denmark . |
| 923455 | 7/1992 | Finland . |
| 650291 | 1/1929 | France . |
| 40 14 158A1 | 11/1991 | Germany . |
| WO 95/16601 | 6/1995 | WIPO . |

*Primary Examiner*—Daniel P. Stodola
*Assistant Examiner*—Vestan B. Booth
*Attorney, Agent, or Firm*—Burns, Doane, Swecker & Mathis, L.L.P.

[57] ABSTRACT

A bicycle stand including a swivelling axis in the transverse direction of the bicycle tire, around which axis the bicycle tire (9) pivots when it is placed in the bicycle stand (1). When pivoting around the swivelling axis, the bicycle tire (9) has an effect on elements that are arranged to render the catch (7) into a locking position when the bicycle tire (9) is in the bicycle stand (1). The catch (7) opens only when the bicycle tire (9) is pivoted around the swivelling axis when the tire is removed from the bicycle stand (1). By locking the bicycle tire (9) with a bicycle lock, the pivoting of the tire (9) around the swivelling axis is prevented, whereby the catch (7) will stay in the locking position.

8 Claims, 3 Drawing Sheets

BICYCLE STAND

BACKGROUND OF THE INVENTION

1. Field of the Invention

The present invention relates to a bicycle stand comprising a frame and supporting elements on both sides of a bicycle tire for supporting a bicycle and for retaining it in the vertical direction, whereby the bicycle tire can be pushed between the supporting elements and pulled therefrom, and that the bicycle stand comprises a swivelling axis in the transverse direction with respect to the bicycle tire, a catch that is on top of the tire when the tire is in the bicycle stand in such a manner that the tire cannot be lifted off the bicycle stand, closing means for moving the catch and a guide for guiding the catch on the tire and off the tire, whereby the closing means are arranged to pivot around the swivelling axis and to move together with the guide the catch into a locking position when the bicycle tire pivots with respect to the swivelling axis when pushing the bicycle into the bicycle stand and correspondingly, to move the catch into an open position when the bicycle tire pivots with respect to the swivelling axis when removing the bicycle from the bicycle stand.

2. Description of Related Art

An ordinary bicycle stand, which comprises supporting arches secured to the frame of the stand in such a manner that the bicycle tire rests on the supporting arches, does not provide any security against thefts. A bicycle in the stand having a rear tire locked with a normal bicycle lock can be easily lifted to a waiting van, for instance. It may not necessarily be very useful to lock the front tire to the stand with a separate lock as the front tire can be easily disengaged from the bicycle and it can be left in the stand and the remaining parts of the bicycle can be taken along. The only slightly better alternative is to lock the frame or the back tire of the bicycle to a solid construction with a separate detachable lock. It is difficult to transport the lock and it may be forgotten to be fastened inadvertently or in a hurry. It is also comparatively easy to open this kind of a separate lock, e.g. a spiral lock, with other keys and a safety pin, for example.

DE 40 14 158 discloses a bicycle stand to which bicycles can be lifted to suspend. The stand comprises a securing part supported by which bicycles can be lifted to suspend from their frames. The securing part has a lock and the lock a catch by means of which the bicycle frame is locked to the securing part. The stand is heavy, complicated and therefore expensive and difficult to manufacture. Further, the stand is difficult to use as the bicycle has to be lifted upwards. And also, a separate key included in the lock of the stand has to be used for locking.

FI 923,455 discloses a bicycle stand in which a bicycle is stored suspended on hook-like suspension parts from the handle-bar in the vertical position. The suspension parts can be moved from the removal position of the bicycle, in which the parts are outside the frame parts, to the locking position in which the parts are protected by the frame parts in a slot or a notch. The parts can be locked to each other by means of a padlock fitted to the tongues. The frame parts of the stand have to be secured either to the wall or to a separate stand, whereby the structure will be difficult, complicated and expensive. The bicycle needs to be locked to the stand with a separate padlock and the movable suspension parts are of a light structure which makes it rather easy to wrench them off, whereby the bicycle will get stolen.

OBJECTS

The objects of this invention is to provide a bicycle stand that does not have the above-mentioned drawbacks.

The bicycle stand according to the invention is characterized in that the bicycle stand comprises guide surfaces that are arranged obliquely with respect to the bicycle tire, whereby the guide surfaces form a guide for guiding the catch, and that the bicycle stand comprises means for locking the catch into a locking position.

The essential idea of the invention is that there is a swivelling axis in the stand around which the bicycle tire is arranged to pivot when placing it in the bicycle stand, that the stand has means for moving the catch device when placing the bicycle in the stand in such a manner that when placing the bicycle in the stand, the catch locks the bicycle tire to the stand. A further essential idea of the invention is that the catch will open only when the bicycle tire is pivoted around the swivelling axis. The idea of a further embodiment is that there are elements in the stand for locking the catch into a locking position by means of a separate lock, for instance.

An advantage of the invention is that when placing the rear tire of the bicycle in the bicycle stand and by locking the rear tire with an ordinary bicycle lock, the pivoting of the tire around the swivelling axis is prevented, whereby the catch keeps the tire locked to the stand. A further advantage is that by locking the catch with a separate locking element to the stand into the locking position, the bicycle cannot be disengaged from the stand even by cutting the spokes.

BRIEF DESCRIPTION OF THE DRAWINGS

The invention will be explained in more detail in the accompanying drawings, in which.

DETAILED DESCRIPTION OF THE PREFERRED EMBODIMENTS

Figure 1:
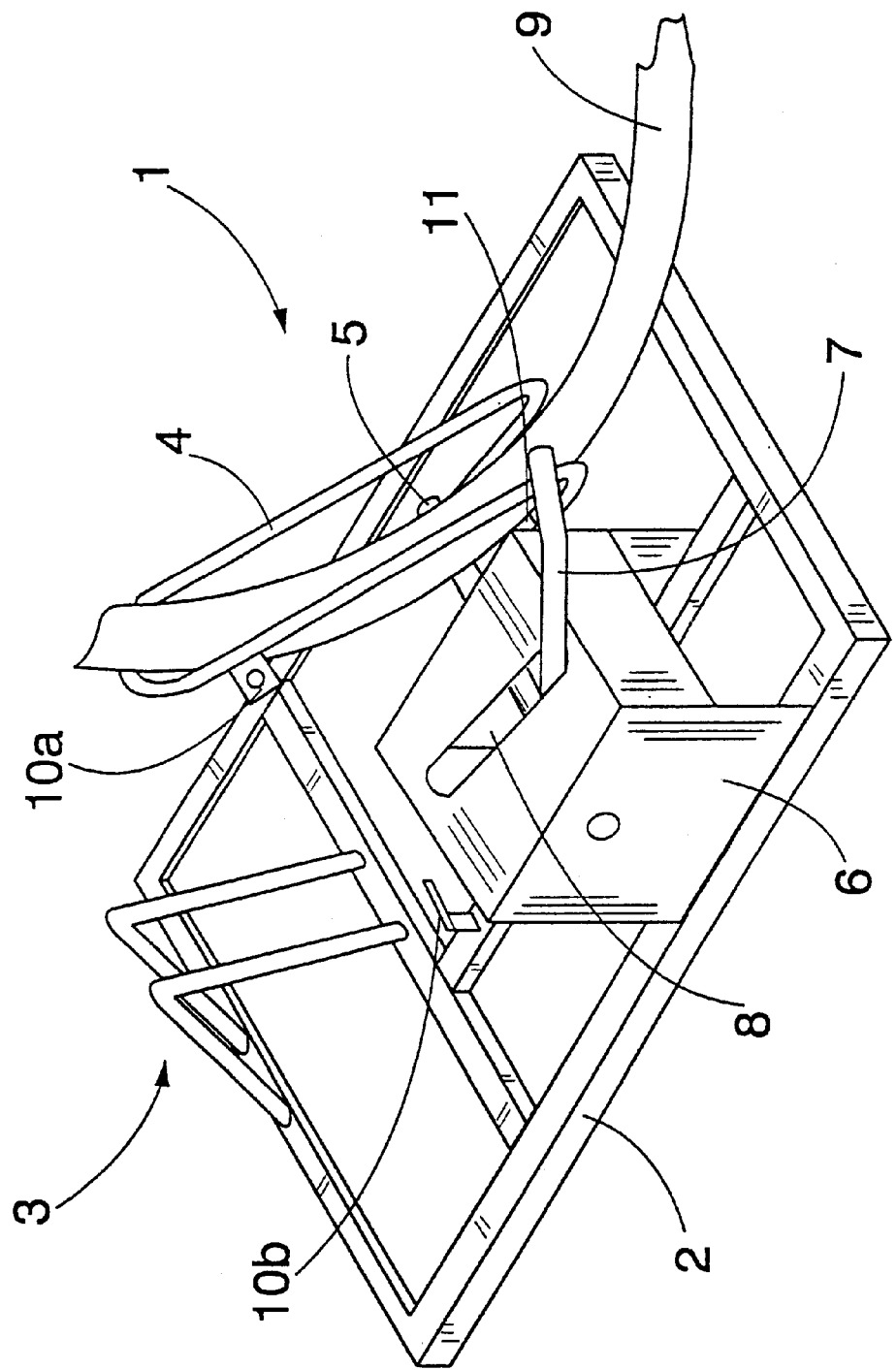
FIG. 1 illustrates an axonometric view of a bicycle stand according to the invention with the catch in an open position.
Figure 2:
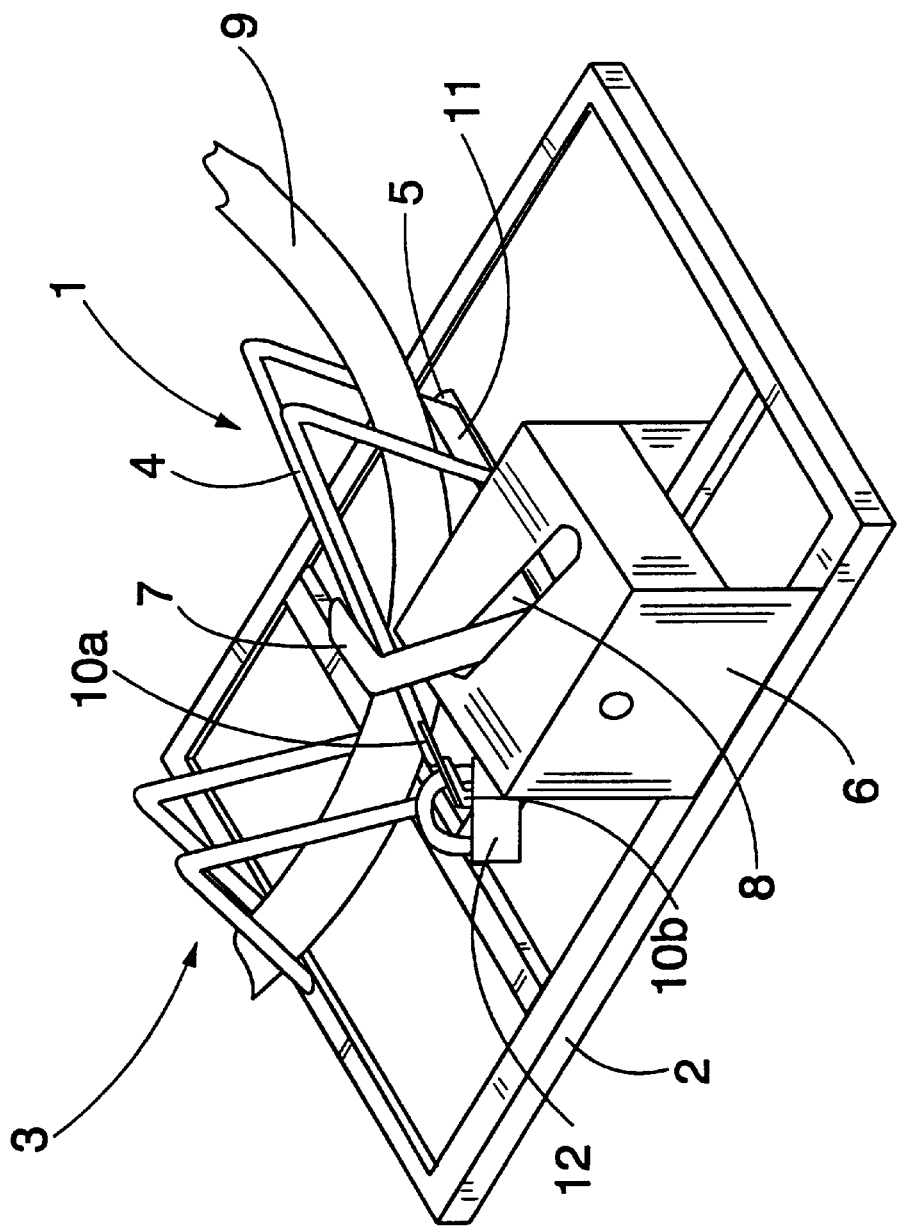
FIG. 2 illustrates an axonometric view of the bicycle stand according to FIG. 1 with the catch in a closed position.

FIG. 1 illustrates a bicycle stand 1 according to the invention. The bicycle stand 1 includes a frame 2 to which a supporting fork 3 is secured. The supporting fork 3 comprises two supporting iron rods installed so that a bicycle tire 9 can be placed between them, whereby the supporting fork 3 retains the bicycle in an upright position. Further, the bicycle stand has a scoop 4 secured to a shaft 5, whereby a pivoted element 4 is arranged to rotate around the central axis formed by the swivelling axis of the shaft 5. The pivoted element 4 comprises a metal rod arranged to support the bicycle tire 9 when placing the bicycle in the bicycle stand 1. The shaft 5 is placed in the bicycle stand 1 transversely with respect to the bicycle tire 9. The shaft 5 is arranged to a chamber 6 in such a manner that it can rotate with respect to the chamber 6. A catch 7 is further arranged to the shaft 5 so that when the shaft 5 pivots, it also pivots the catch 7. The catch 7 is further arranged to move in a slot 8 of the chamber 6. The slot 8 is arranged to the chamber 6 obliquely so that the end of the slot 8 on the side of the supporting fork 3 is closer to the pivoted element 4 than its other end. In that case, when placing the bicycle in the bicycle stand 1, the bicycle tire 9 pivots the pivoted element around the shaft 5, whereby the catch 7 also pivots around the shaft 5. At the same time, the slot 8 guides the catch 7 towards the pivoted element 4, that is, the edges of the slot 8 form guide surfaces that guide the catch 7. When the tire 9 is placed in the bicycle stand so that the pivoted element 4 is in its lowest position, the catch 7 settles on top of the tire 9 and locks it to the bicycle stand 1 as shown in FIG. 2. The pivoted element 4 comprises a first locking link 10a and the frame 2 a second locking link 10b, respectively, which are settled against one another when the pivoted element 4 is in its lowest position. A counter plate 11 is placed in the pivoted element 4 in connection with the shaft 5 on the opposite side of the supporting fork 3. When removing the tire 9 from the bicycle stand 1, the tire 9 presses the counter plate 11 so that the shaft 5 also pivots.

FIG. 2 shows the bicycle stand 1 according to FIG. 1 with the catch 7 in a closed position. The numbers in FIG. 2 correspond to those in FIG. 1. When the pivoted element 4 is in its lowest position as in FIG. 2, the catch 7 has to be so low down that the tire 9 cannot be lifted upwards and pulled over the shaft 5 without pivoting the tire 9 with respect to the shaft 5. In that case, if the tire 9 is the rear tire of the bicycle, it can be locked with an ordinary bicycle lock, whereby it cannot rotate around its central shaft, nor pivot with respect to the shaft 5. On the other hand, the catch 7 should be arranged so that when the tire 9 is pivoted with respect to the shaft 5 in such a manner that the lowest part of the tire in the bicycle stand 1 rises, the catch 7 also lifts up, and thus allows the tire 9 to be pivoted. It is theoretically possible that a locked bicycle tire can be pivoted by cutting spokes next to the bicycle lock first. A theft of this kind can be prevented in winter storage, for example, by locking the first locking link 10a and the second locking link 10b to each another with a separate padlock 12, whereby the pivoted element 4 cannot be pivoted with respect to the shaft 5 and therefore the catch 7 will maintain in its closed position.

The shaft 5 is preferably higher up than the lowest point of the tire 9 when the tire 9 is placed in the bicycle stand 1. In that case, the shaft 5 forms a sill that in part supports the tire 9 and makes the position of the bicycle in the bicycle stand more secure. On the other hand, when the shaft 5 is placed in this way, the elevation of the catch 7 can be defined more freely.

Figure 3:
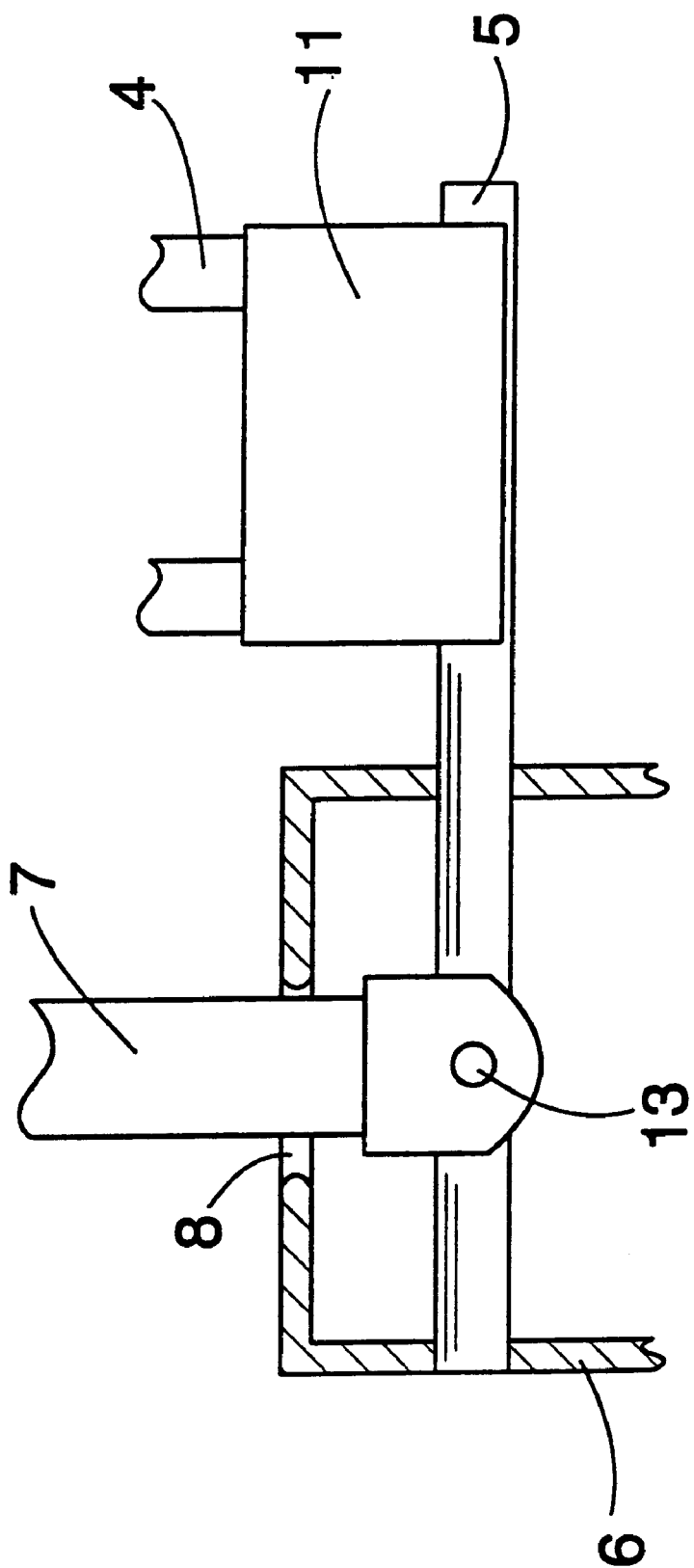
FIG. 3 illustrates a cross section of a detail of the bicycle stand according to FIG. 1.

FIG. 3 shows how the catch 7 is secured to the shaft 5. The numbers in FIG. 3 correspond to those in FIGS. 1 and 2. The catch 7 must be able to pivot in the direction of the shaft 5 when it moves guided by the slot 8 between open and closed positions. This is made possible by securing the catch 7 to the shaft 5 by means of a joint 13 in the transverse direction with respect to the shaft.

The drawings and the specification related thereto are only meant to illustrate the idea of the invention. In its details, the invention may vary within the scope of the claims. Therefore, several bicycle stands can be fastened to one another side by side. This construction also makes it more difficult for vandals to remove the bicycle stand. On the other hand, the bicycle stand can be fastened permanently to some solid construction, such as concrete or asphalt, with bolts, whereby it cannot be pivoted to open the catch 7. If the pivoted element 4 is formed suitably to support the tire 9, the supporting fork 3 is not necessary for the bicycle stand. On the other hand, if the stand has supporting structures for the tire, such as the supporting fork 3, the pivoted element 4 can be e.g. a similar plate as the counter plate 11, whereby the tire 9 rests on these plates when placing the bicycle in the stand and when removing it therefrom. The supporting structures for the tire, such as the supporting fork 3 or the suitably formed iron rods of the pivoted element 4, prevent the tire 9 from being disengaged from the bicycle stand from the side. A fixed stud can be used instead of the shaft 5, on top of which stud a bushing is arranged, and the pivoted element 4, the counter plate 11 and the catch 7 are fastened to the bushing, whereby the central axis of the stud forms a swivelling axis. The guide surfaces for guiding the catch 7 can also be formed by placing two rods obliquely with respect to the tire 9 so that the rods guide the movement of the catch 7 between them. The locking links 10a and 10b can be positioned at any place in the bicycle stand; it is essential that by locking them, the catch 7 will be locked into a locking position, whereby the bicycle cannot be disengaged from the stand even by cutting the spokes. The bicycle stand can be fastened to a wall, for example, in such a manner that it can be lifted out of the way for the duration of ploughing or sanitation work. The bicycle stand can also be constructed so that the bicycles can be placed therein obliquely so that the space occupied by them will be smaller.

I claim:

1. A bicycle stand for securely holding a bicycle comprising, a frame and vertical supporting elements for supporting both sides of a tire of the bicycle and for retaining the bicycle in the vertical direction, whereby the bicycle tire can be pushed between the supporting elements and pulled therefrom, and that the bicycle stand further comprises a swivelling axis extending in a transverse direction with respect to the supporting elements, a catch partly situated in a chamber attached to the frame, the catch being movable as the tire is pivotably inserted into the bicycle stand, from an open position into a locking position where the tire cannot be lifted off the bicycle stand, closing means for moving the catch and guide surfaces being formed on the chamber for guiding the catch on the tire into the locking position and off the tire into the open position, whereby the closing means is arranged to pivot around the swivelling axis and is arranged together with the guide surfaces to move the catch into the locking position when the bicycle tire pivots with respect to the swivelling axis when pushed into the bicycle stand and, correspondingly, to move the catch into the open position off the tire when the bicycle tire pivots with respect to the swivelling axis when removing the bicycle from the bicycle stand, wherein the chamber has a slot extending obliquely with respect to the bicycle tire, whereby the slot forms the guide surfaces for guiding the catch, and that the bicycle stand comprises means for locking the catch into the locking position.

2. A bicycle stand according to claim 1, wherein the closing means for moving the catch comprises a pivoted element and a counter plate.

3. A bicycle stand according to claim 2, wherein the pivoted element is arranged to form the supporting elements for supporting the said both sides of the tire, for preventing the tire from being disengaged from the side.

4. A bicycle stand according to claim 1, wherein the catch is arranged to both pivot around the swivelling axis and to move in an axial direction of the swivelling axis, whereby the guide surfaces are arranged to guide the catch in the axial direction of the swivelling axis into the locking position while the catch pivots around the swivelling axis from the open position into the locking position.

5. A bicycle stand according to claim 4, wherein the bicycle stand comprises a shaft to which the catch is secured by a joint transversely with respect to the shaft and to which the closing means is secured fixedly for moving the catch.

6. A bicycle stand according to claim 5, wherein the shaft is higher up than a lowest point on the bicycle stand at which the stand is adjacent to the tire, when the tire is placed in the bicycle stand.

7. A bicycle stand according to claim 1, wherein the bicycle stand comprises a supporting fork that forms one set of supporting elements for supporting the tire on said both sides of the tire.

8. A bicycle stand according to claim 1, wherein the means for locking the catch into the locking position comprises a first locking link and a second locking link, which first locking link is secured to the closing means for moving the catch, and which second locking link is secured to the frame, whereby locking the first locking link and the second locking link to each other will lock the catch into the locking position.

\* \* \* \* \*